(12) United States Patent
Johnson et al.

(10) Patent No.: US 6,654,154 B2
(45) Date of Patent: Nov. 25, 2003

(54) LIGHT SWITCHING DEVICE WITH RESET

(75) Inventors: Mark Thomas Johnson, Eindhoven (NL); Iain Mcintosh Hunter, Brighton (GB); Steven Charles Deane, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 62 days.

(21) Appl. No.: 10/042,448

(22) Filed: Jan. 8, 2002

(65) Prior Publication Data

US 2002/0109900 A1 Aug. 15, 2002

(30) Foreign Application Priority Data

Jan. 12, 2001 (EP) .............................................. 01200094

(51) Int. Cl.⁷ .............................. G02F 1/153; G02F 1/29
(52) U.S. Cl. ........................ 359/275; 359/267; 359/370
(58) Field of Search ................................ 359/245, 247, 359/291, 290, 298, 320, 315, 275, 267

(56) References Cited

U.S. PATENT DOCUMENTS 5,905,590 A    5/1999   Van Der Sluis et al. .... 359/275
6,111,684 A  * 8/2000   Forgette et al. ............. 359/267

FOREIGN PATENT DOCUMENTS

GB         1518249 A    7/1978   ............. G09F/9/30

* cited by examiner

Primary Examiner—Loha Ben
Assistant Examiner—M. Hasan
(74) Attorney, Agent, or Firm—Eric M. Bram

(57) ABSTRACT

A reset driving scheme for addressing a switching mirror display enables current to flow in two directions through the switching elements. The display is forced into a predefined state and drives the display into the other optical states by using an addressable TFT providing a continous current.

10 Claims, 3 Drawing Sheets

LIGHT SWITCHING DEVICE WITH RESET

BACKGROUND AND SUMMARY

The invention relates to a light switching device that is reversibly switchable between at least a first state of reflecting light and a second state, the second state being either a state of absorbing light or a transmissive state, said device comprising a stack of layers including a switchable layer of an optically switchable material which brings about a switch from the first state to the second state of the device in particular a material in which switching is obtained by changing a density of hydrogen.

U.S. Pat. No. 5,905,590 describes a switching device comprising a switching film including hydrides of magnesium with other trivalent metals. By exchange of hydrogen, the switching film can be reversibly switched from a transparent state to a mirror-like (fully reflecting or scattering) state with zero transmission via an intermediate black absorbing state. The switching film is comprised in a stack of layers, which is deposited on a transparent substrate. By virtue of the optical effect the device can be used as an optical switching element, for example as a variable beam splitter, optical shutter, and for controlling the illuminance or the shape of light beams in luminaires. The switching device can also be used for data storage and in optical computing, and in applications such as architectural glass, vision control glass, sunroofs and rear-view mirrors. By making a pattern in the switching film and providing the patterned switching film with transparent electrodes a thin display can be manufactured.

It is a problem with this type of devices that since the speed of the switching effect is determined by the transport of hydrogen, the device is relatively slow.

It is an object of the invention to provide a switching device, which has an improved speed. To this end, the invention provides a display device in accordance with claim 1.

The invention is based on the insight that on the one hand the amount of charge required to address a pixel is so large that this cannot be loaded to a pixel during a number of subsequent addressing periods while on the other hand the pixel is comparable to a rechargeable battery. In the switching mirror device H-ions diffuse from one H-containing layer to the other whilst an electric current flows around the device. The optical properties depend on the state of charge of this hydrogen battery. By changing the polarity of the applied voltage the H-ions will flow back.

By introducing, according to the invention, for each pixel element a series connection of the pixel element and a current source to charge the pixel element and further means for resetting at least part of the pixel elements to a defined state, a large current can be introduced in both directions, allowing fast switching of the pixels.

In a first embodiment of the invention the common point of the pixel element is connected via a switch to a reset voltage. Reset is obtained by closing the switch.

In a preferred embodiment of the invention the series connection of the pixel element and the current source is provided between voltage connections and the means for resetting comprise means to switch one of the voltage connections between at least two voltages having different signs with respect to the other voltage connection (symmetric devices). In this way the extra switch for reset can be dispensed with, which in the transmissive mode leads to a higher aperture.

For asymmetric devices it may also be possible to switch between two different amplitudes.

Preferably the current source comprises a capacitor element connected to a control connection of a transistor.

BRIEF DESCRIPTION OF THE DRAWING FIGURES

These and other aspects of the invention will now be described with reference to the drawings, in which.

The figures are schematically and not drawn to scale. In general like reference numerals identify like elements.

DETAILED DESCRIPTION

Figure 1A:
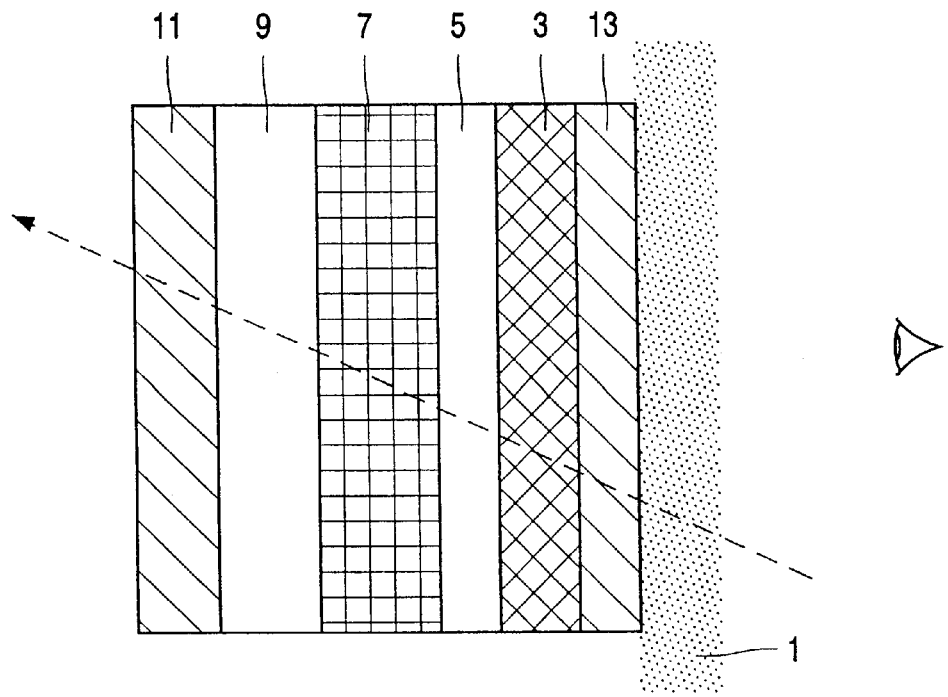
FIGS. 1A, 1B show a cross-section of a stack of layers of a switching mirror display.
Figure 1B:
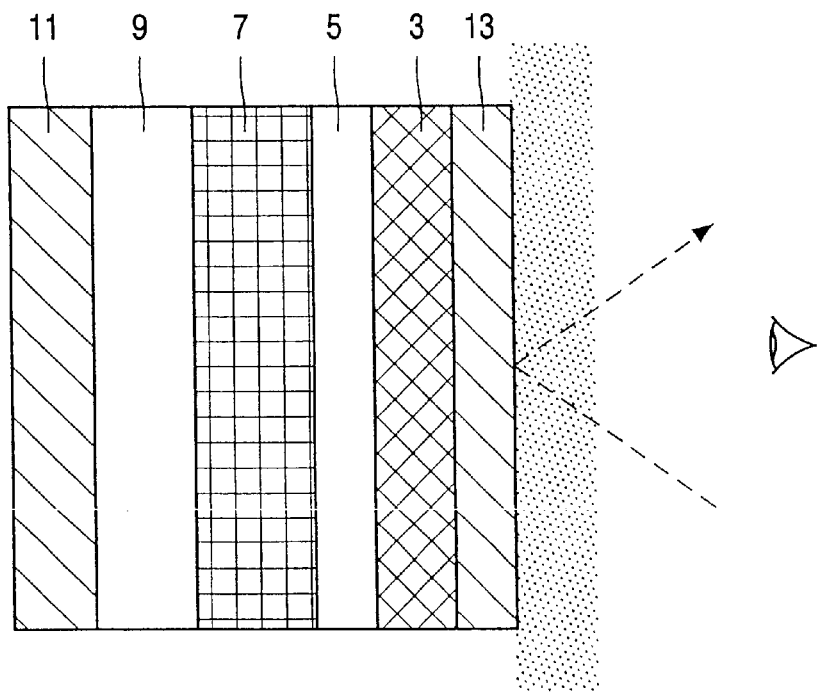

FIGS. 1A, 1B show a cross-section of a switching mirror device. The device comprises a transparent glass plate 1 on which a stack of layers is deposited by means of conventional methods, such as vacuum evaporation, sputtering, laser ablation, chemical vapor deposition or electroplating. The stack comprises a layer 3 of $LMgH_x$ (L being an element of the Lanthanide series of the Periodic System of Elements, Sc, Y or Ni) as a switching film with a thickness of about 200 nm, a palladium layer 5 with a thickness of about 5 $\mu$m, a layer 7 of an ion-conducting electrolyte with a thickness in the range of 0.1 to 10 $\mu$m and a hydrogen storage layer 9.

$GdMgH_x$ is a very suitable switching material, as far as optical properties and switching time is concerned, but other magnesium-lanthanide alloys might be employed as well. The switching film 3 may be reversibly switched between a low-hydrogen composition and a high-hydrogen composition. At intermediate H compositions the film is absorbing in various degrees. The various compositions have different optical properties. At a low-hydrogen content, the film has a metallic character, and is non-transparent. The film then reflects like a mirror. At a high hydrogen content, the film 3 is semiconductive and transparent, whereas at intermediate hydrogen concentration the switching film is absorbing.

The palladium layer 5 serves to increase the rate of hydriding or dehydriding, and thus the switching speed. Other electro-catalytic metals or alloys, such as platinum or nickel might also be used. In addition, this metal layer protects the underlying switching film 3 against corrosion by the electrolyte. The palladium layer 5 may have a thickness in the range between 2 and 25 nm. Thin layers of 2 to 10 nm are preferred, however, because the thickness of the film determines the maximum transmission of the switching device.

For a proper functioning also an H-storage layer 9 and an H-ion conducting electrolyte layer 7 are required. A good H-ion conducting electrolyte is $ZrO_{2+x}H_y$. The electrolyte must be a good ion conductor, but it must be an isolator for electrons in order to prevent self-discharge of the device. Use is most preferably made of transparent solid-state electrolytes, because of the simplicity of the device; they prevent sealing problems, and the device is easier to handle.

If the transparent state of the switching mirror is required, then a good candidate for the storage layer is $WO_3$.

The stack is sandwiched between two transparent electroconductive electrode layers 11, 13 of, for example, indium-tin oxide (ITO). Electrode layers 11, 13 are connected to an external current source (not shown). By applying a DC current, the low-hydrogen, mirror-like composition is converted to the high-hydrogen composition, which is transparent and neutral gray. The device now acts as a transparent window, as is shown in FIG. 1A by the dashed line. When reversing the current, the switching film 3 returns to the low-hydrogen state, which is mirror-like and non-transparent, as is shown in FIG. 1B. The switching time is comparable to that of conventional electrochromic devices. The device can operate at room temperature. Once the mirror has reached the desired optical state, virtually no current will flow through the device. This means that the display will hold information with a very low power.

Figure 2:
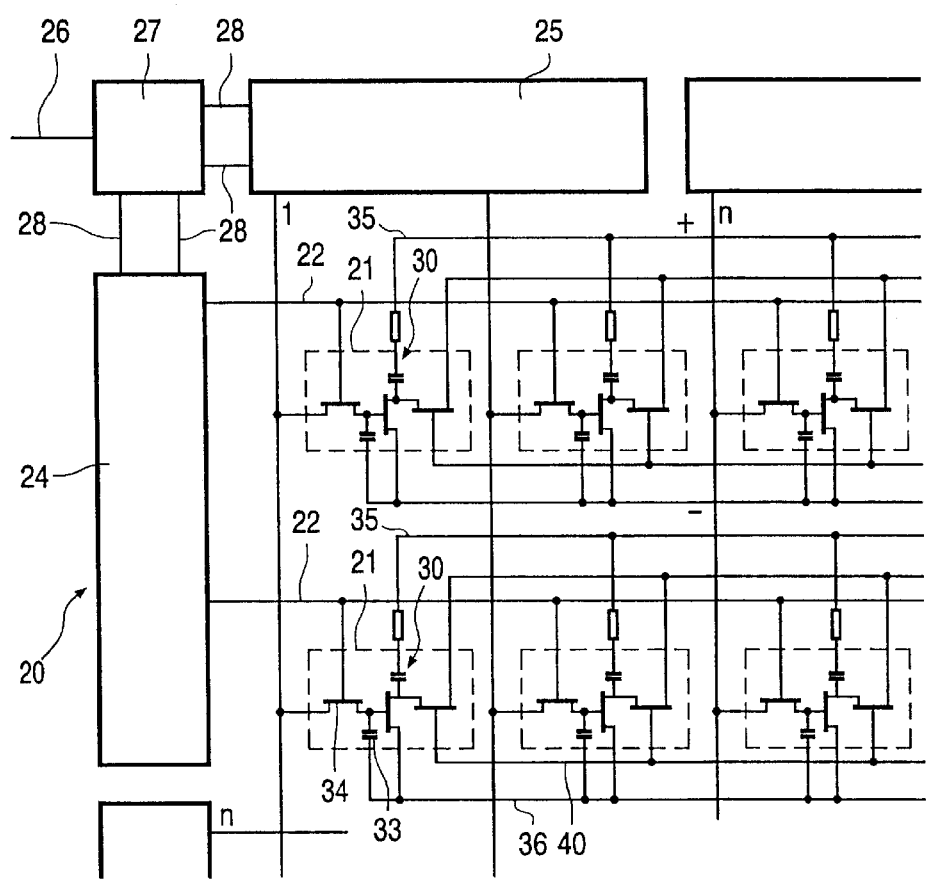
FIG. 2 shows part of a matrix of pixel elements of a switching mirror device according to the invention.

FIG. 2 shows a part of a display device 20 comprising a matrix of display circuit elements 21 at the areas of crossings of m row electrodes 22 (selection electrodes) and n column electrodes 23 (data electrodes). Row electrodes 22 are selected by means of a row driver 24, while column electrodes 23 are provided with data voltages via a column driver 25. Incoming data signals 26 are, if necessary, processed in a processor 27. Mutual synchronization occurs via control lines 28.

Figure 3:
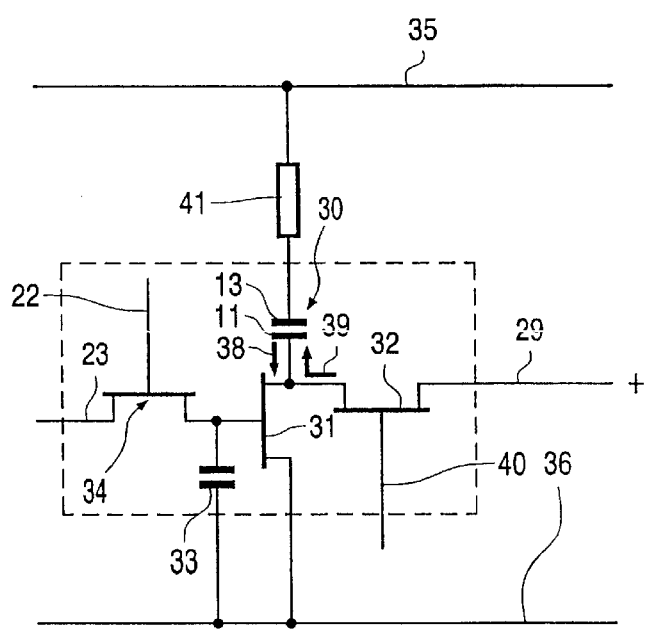
FIGS. 3 and 4 show schematically various embodiments of the device according to the invention.

One embodiment of a display circuit elements 21 according to the invention will now be describe with reference to FIG. 3. It comprises a switching mirror device 30 as described with reference to FIGS. 1A, 1B, which for simplicity is represented by a capacitor. One transparent electroconductive electrode layer, 11 in this example, is connected to a fixed reference voltage (0V in this example) supplied by a voltage line 35. The other transparent electroconductive electrode layers 13, is connected via a switch, in this example a n-type field effect transistor (TFT) 31 to a negative power voltage line 36. The gate connection of TFT 31 is connected to one plate of a capacitor 33, which functions as a storage capacitor and is addressed by TFT 34 via m row electrodes 22 (selection electrodes) and n column electrodes 23 (data electrodes).

During selection of a row via electrodes 22 the data voltage, as supplied by data electrode 23 is transferred to the gates of the n-type TFT 31. The field effect transistor (dependent on the sign of the data voltage) starts conducting and acts as a current source and starts charging (arrow 38) the switching mirror element 30. During the hold time the remainder of rows in the display are selected. The storage capacitor 33 (which may be formed by the inherent gate-drain capacitance of TFT 31) ensures that, during this hold time, the current sources continue to deliver current needed for switching the switching mirror elements 30. This may be effected during one frame period (the time all lines are selected once), but may also last several frame times (depending on the size of the display, the dimensions of the mirrors and the TFTs). After completion of the charging the current is switched off. To detect the end of charging or reset preferably a current sensor 41 is present in the current path common to both the charge mode and the reset mode. The switching mirror element 30 will now remain in the state it reached.

Before charging the switching mirror elements 30, according to the invention, all or parts of the switching mirror elements are reset (discharged (arrow 39)). In this example this is accomplished by means of an extra positive power voltage line 29. The voltage on said line 29 is applied to electrode layer 11 via a switch (TFT) 32, controlled by control line 40. By using a voltage source for reset the reset is carried out at the optimal speed (the current is not limited) while, by choosing a suitable voltage the switching mirror element never exceeds the maximum voltage which can be applied before degradation occurs.

Preferably the reset voltage is chosen in such a way as to reset the display to a reflective or white (transmissive) mode. This is advantageous for many applications, such as document viewers and electronic books, where information is given as dark letters on a white background. In this case the smallest percentage of the display needs reset (only the dark pixels) resulting in a low power driving method and extended display lifetime.

Figure 4:
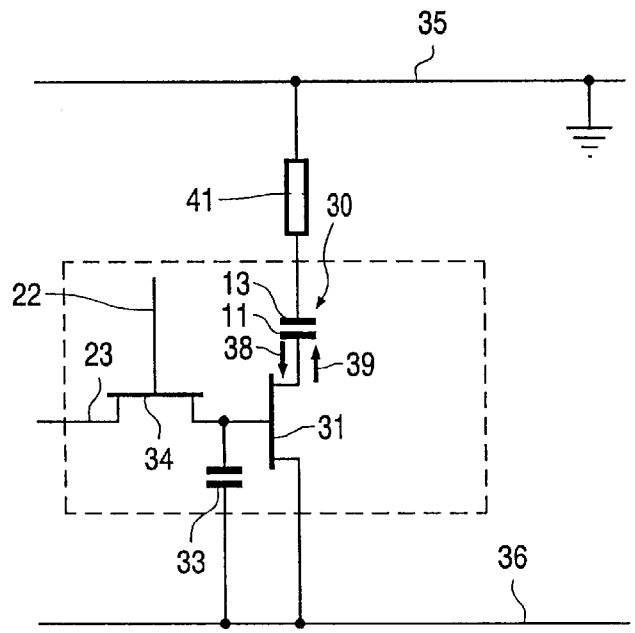

FIG. 4 shows another embodiment in which the voltage line 29 and TFT 2 of FIG. 3 are dispensed with, so a larger aperture can be realized. Not shown driving means are able to switch power voltage line 36 between a negative voltage (drive voltage) and a positive voltage (reset voltage).

Reset of an image is obtained by first setting the power supply line 36 to the reset voltage, and addressing all TFTs 31 to on; the latter can be done a row on a time or by addressing all rows simultaneously. The TFTs 31 act as switches and all switching mirror elements are reset. Dependent on the specific characteristics of the TFTs and the switching mirror elements the reset current gradually decreases and the previous image will be erased. The switching mirror elements then become high impedance and current stops flowing. If necessary this reset mode can be interrupted if the current goes below a certain level by means of current sensor 41.

Before the next charge mode the picture elements defining an image are selected and in the charge mode the power supply line 36 is set to the drive voltage, so the new image is displayed. All TFTs 31 are then addressed to off, to reduce any gate voltage stress. The new image will remain until the cycle is repeated. Other reference numerals in FIG. 4 have the same meaning as those in FIG. 3.

Figures 5A, 5B:
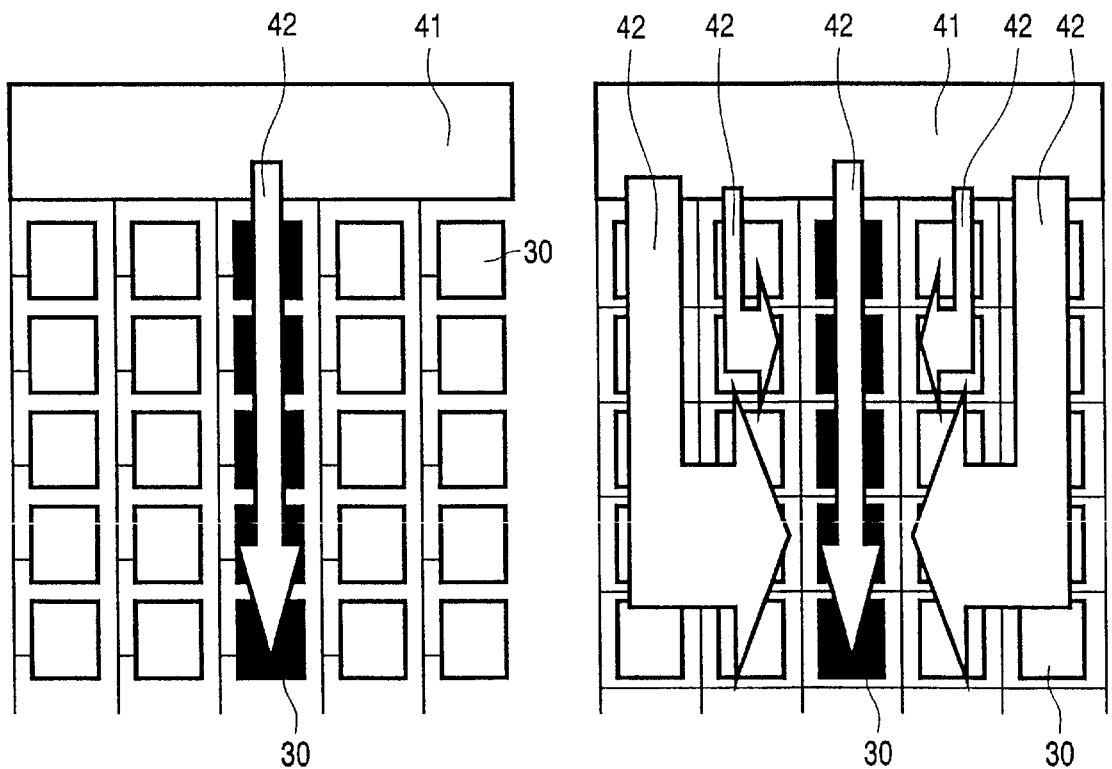
FIGS. 5A, 5B show a plan view of a device according to the invention.

Although wide metal tracks, such as aluminum (or aluminum alloys) may be used for power supply lines 36 voltage drop may occur along said lines, especially if a block of picture elements is reset (charged). If picture elements (switching mirror elements 30) are selected on a line by line (or column by column) base (compare FIG. 5A) picture elements closer to the power supply line will switch first. This may lead to artefacts, especially if many picture elements have to switch. One solution may be to provide the power supply lines in a mesh or comb structure. Such a mesh is shown in FIG. 5B. Here the current (arrows 42 is distributed along many parallel lines leading to more uniform switching.

It goes without saying that other ways of resetting the picture elements (switching mirror elements 30) are also possible. For example, in FIG. 3 the reset voltage may be applied to electrode 11, for instance by using a switchable voltage source. Another way of resetting is obtained by shortcircuiting the switching mirror elements 30. Reset can also be obtained by addressing all rows (or a subset) and supplying the reset voltage via the column driver.

The protective scope of the invention is not limited to the embodiments described. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

What is claimed is:

1. Display device being operable in a reflective mode or in a transmissive mode and having pixel elements for modulating light, said pixel elements comprising:

a stack of layers including a switchable layer of an optically switchable material that switches the pixel elements from a first state to a second state, the second state being different from the first state, the first state and the second state being one of the following states: a reflective state, a transmissive state, or an absorbing state;

means for modulating light in the reflective mode by switching from a reflective state to a non-reflective state, and for modulating light in the transmissive mode by switching from a transmissive state to a non-transmissive state, the non-reflective state being the transmissive state or the absorbing state and the non-transmissive state being the reflective state or the absorbing state, the means for modulating light comprising for each pixel element a series connection of the pixel element and a current source to charge the pixel element (charge mode); and means for resetting at least part of the pixel elements to a defined state (reset mode).

2. Display device according to claim 1 in which the optically switchable layer brings about switching by changing a concentration of hydrogen.

3. Display device according to claim 1 in which the common point of the pixel element and a current source is connected via a switch to a reset voltage.

4. Display device according to claim 1 in which the current source comprises a capacitor element connected to a control connection of a transistor.

5. Display device according to claim 1 in which the device comprises means for resetting all pixel elements to a defined state and further means to charge selected pixel elements.

6. Display device according to claim 5 in which the series connection of the pixel element and the current source is provided between power voltage connections and the means for resetting comprise means to switch one of the power voltage connections between at least two voltages having different signs or amplitudes with respect to the other power voltage connection.

7. Display device according to claim 1 in which a current sensor is provided in the current path common to both the charge mode and the reset mode of the display device.

8. Display device according to claim 1 in which the pixel elements are provided in a matrix structure and the further means comprise select switches controlled by select lines, to which data is presented via data lines.

9. Display device according to claim 8 in which power voltage connections for at least a group of pixel elements are provided as a mesh structure.

10. Display device according to claim 1 in which the switches comprise thin film transistors.

* * * * *